United States Patent [19]

Nozawa et al.

[11] Patent Number: 4,516,211
[45] Date of Patent: May 7, 1985

[54] NUMERICAL CONTROL SYSTEM

[75] Inventors: Ryoichiro Nozawa, Shibuya; Tsuyoshi Nagamine; Hideaki Kawamura, both of, Hachioji; Kentaro Fujibayashi, Musashino, all of Japan

[73] Assignee: Fujitsu Fanuc Limited, Minamitsuru, Japan

[21] Appl. No.: 394,914

[22] PCT Filed: Oct. 23, 1981

[86] PCT No.: PCT/JP81/00296
§ 371 Date: Jun. 18, 1982
§ 102(e) Date: Jun. 18, 1982

[87] PCT Pub. No.: WO82/01599
PCT Pub. Date: May 13, 1982

[30] Foreign Application Priority Data

Oct. 23, 1980 [JP] Japan ............... 55-148759

[51] Int. Cl.³ .................. G06F 15/46; G05B 19/18
[52] U.S. Cl. .................. 364/474; 318/572; 364/170
[58] Field of Search .............. 364/167–171, 364/474, 475; 318/572, 574, 569, 570

[56] References Cited

U.S. PATENT DOCUMENTS

| 3,430,121 | 2/1969 | Yoshitake et al. | 318/572 |
| 3,633,011 | 1/1972 | Bederman et al. | 318/574 X |
| 3,665,280 | 5/1972 | Payne et al. | 364/170 X |
| 3,866,027 | 2/1975 | Cutler et al. | 318/572 |
| 4,162,527 | 7/1979 | Kilbane et al. | 364/170 X |
| 4,330,831 | 5/1982 | Schwefel | 364/170 X |

OTHER PUBLICATIONS 49-101790 (Hitashi, Ltd.) 1974-9-26.
International Search Report, PCT/JF81/00296.

Primary Examiner—Joseph F. Ruggiero
Attorney, Agent, or Firm—Staas & Halsey

[57] ABSTRACT

The coordinate values (X, Y, Z) for the position of the front end of a tool and the vector (I, J, K) of the axial direction of the tool are read in from a command tape by a tape reader. Using these values and a tool length l set by a dial or the like, a movement data calculation circuit calculates the orthogonal coordinate values (x, y, z) of the position Q of the center of rotation of the tool and spherical coordinate values (b, c) indicative of the position of the rotational angle of the tool. After these coordinate values are converted into pulses for moving the tool in the respective axial directions by a pulse distribution circuit, servomotors are driven by the pulse signals and through servo circuits so as to move the tool or a table to a desired machining position.

5 Claims, 4 Drawing Figures

NUMERICAL CONTROL SYSTEM

DESCRIPTION

BACKGROUND OF THE INVENTION

The present invention relates to a numerical control system, and more particularly to a numerical control system which is suitably applied to a numerical control machine tool wherein a tool is moved or rotated in the directions of three X, Y and Z (orthogonal coordinate system) axes and in the directions of two B and C (spherical coordinate system) axes so as to subject a workpiece to three-dimensional machining.

In a machine tool, for example as found in a machining center, a tool or a table is rotated in the vertical rotational direction (B-axial direction) and the horizontal rotational direction (C-axial direction) so as to control the axial direction of the tool relative to a workpiece or the table (the axial direction being the tool axis direction), and it is also moved in the directions of the three X, Y and Z axes so as to subject the workpiece to a desired machining operation.

In general, in such 5-axis control, the position Q(x, y, z) of the center of rotation of the tool and the position of the tool axis; that is the angular position (b, c) of a rotational angle are entered from a command tape as numerical control (hereinafter "NC") command data. When supplied with the NC command data, a pulse distribution circuit within the NC system executes pulse distribution computations to rotate the tool in the B- and C-axial directions so as to bring the axial direction of the tool into agreement with a commanded tool axis direction, for example, normal direction to the workpiece. The pulse distribution circuit also moves a tool holder as well as the tool in the X, Y and Z directions so as to subject the workpiece to the programmed three-dimensional machining.

In this regard, the command tape for the 5-axis control is usually prepared as follows. Firstly and with reference to FIG. 1, the coordinates (X, Y, Z) of the position P of the front end of the tool, as found by a main processor, the vector (I, J, K) of the tool axis direction at the front end position (for example, normal to the workpiece) as found by the main processor, and a length l from the position Q of the center of rotation of the tool to the position P of the front end of the tool, are input to a post-processor. The position Q (x, y, z) of the center of rotation of the tool and the position (b, c) of the tool axis are found by the post-processor. Lastly, these values x, y, z, b and c are punched in a tape as the command data, to obtain the predetermined command tape.

When using a tape prepared using the above method, when the length l of the tool changes, this tape cannot be used and a separate new tape must be made, even when the shape to be machined is identical. Moreover, in a machining operation in which fine finishing is performed after rough finishing, two tapes, one for the rough finishing and one for the fine finishing, must be prepared, and a single tape cannot be used for both the rough finishing and the fine finishing.

SUMMARY OF THE INVENTION

An object of the present invention is to provide a numerical control system in which even when a tool length l has changed, a command tape need not be remade so long as the shape to be machined remains identical, and in which a single command tape can be used for both rough finishing and fine finishing.

To achieve the above and other objects, the present invention provides a tool or a table capable of being rotated in at least one of the vertical and horizontal directions so as to control the axial direction of the tool relative to a workpiece and capable of being moved in the directions of the X-, Y- and Z-axes so as to subject the workpiece to desired three-dimensional machining. Also, Command data including the position of the front end of the tool and the vector of the tool axis are entered via a first input means such as a tape, a length (l) from the center of rotation of the tool to the front end of the tool is entered via a second input means. The orthogonal coordinate values of the center of rotation of the tool and the position of the rotational angle of the tool or of the workpiece are calculated from the command data and the length (l), within a numerical control device, and interpolation computations are executed on the basis of the calculated resultant positional information so as to move the tool to a commanded position.

DESCRIPTION OF THE PREFERRED EMBODIMENT

The present invention will now be described with reference to the drawings in order to explain it in greater detail.

Figure 1:
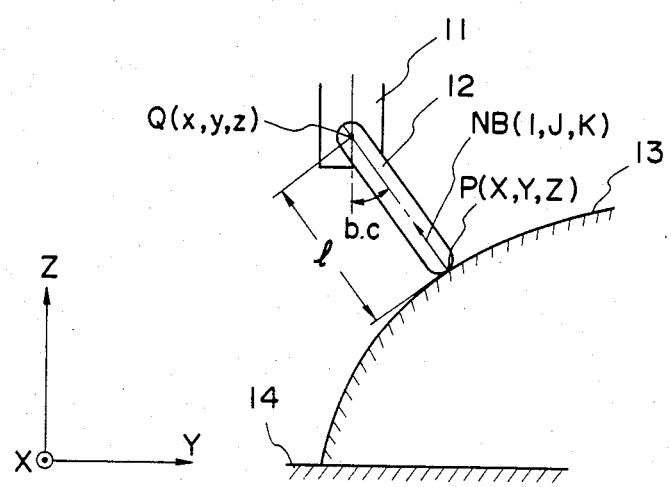
FIGS. 1 and 2 illustrate the 5-axis control in which a table and workpiece are fixed and in which a tool is moved in the directions of the five: X, Y, Z, B and C axes.
Figure 2:
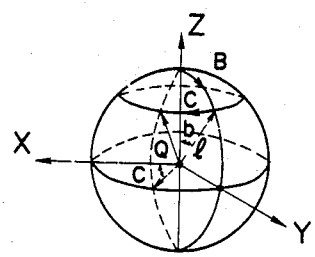

FIGS. 1 and 2 illustrates the 5-axis control in a case where a table and workpiece are fixed and where a tool is moved in the directions of the three X, Y and Z (orthogonal coordinate system) axes and in the directions of the two of B and C (spherical coordinate system) axes.

In FIG. 1, numeral 11 designates a tool holder which supports a tool and which is driven in the three axial directions of the X-, Y- and Z-axes by servomotors not shown. Numeral 12 designates the tool having a front end position indicated by P(X, Y, Z) and which is rotated in the B- and C-axial directions about the position Q(x, y, z) which is the center of rotation. The B-axial and C-axial directions are the vertical rotational direction and horizontal rotational direction, respectively (FIG. 2), measured within the spherical coordinate system by a rotational angle b along the B-axis, a rotational angle c along the C-axis and a tool length l. Numeral 13 indicates a workpiece, and numeral 14 designates a table on which the workpiece 13 is placed.

Figure 3:
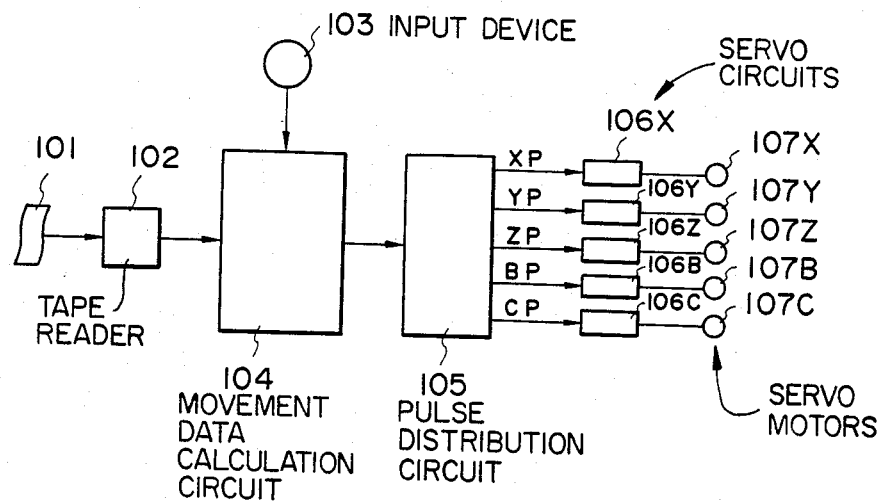
FIG. 3 is a circuit block diagram showing an embodiment of the present invention.

FIG. 3 is a circuit block diagram showing an embodiment of the present invention in FIG. 3, numeral 101 indicates a command tape containing the position P(X, Y, Z) of the front end of the tool 12 (FIG. 1) and the vector NB (I, J, K) of the tool axis direction of the tool, as well as a feed rate command, a spindle speed command, etc. are punched or on the tape recorded. Numeral 102 designates a tape reader, and numeral 103 an input device such as a dial or digital switch for entering the length l, measured from the center of rotation Q of the tool to the front end position P of the tool. Numeral 104 indicates a movement data calculation circuit. This circuit calculates the orthogonal coordinate values (x, y, z) of the rotational center Q of the tool and the spherical coordinate values (b, c) indicative of the position of the rotational angle of the tool 12, using the coordinates (X, Y, Z) of the front end position of the tool, the vector (I, J, K) of the tool axis direction and the tool length l and Equations (1)–(5).

$$x = X + \frac{I}{\sqrt{I^2 + J^2 + K^2}} \cdot l \quad (1)$$

$$y = Y + \frac{J}{\sqrt{I^2 + J^2 + K^2}} \cdot l \quad (2)$$

$$z = Z + \frac{K}{\sqrt{I^2 + J^2 + K^2}} \cdot l \quad (3)$$

$$b = \tan^{-1} \frac{\sqrt{I^2 + J^2}}{K} \quad (4)$$

$$c = \tan^{-1} \frac{J}{I} \quad (5)$$

Equations (4) and (5) are the equations for transforming coordinates from the orthogonal coordinate system to the spherical coordinate system. More specifically, referring to an orthogonal coordinate system and a spherical coordinate system having their respective origins coincide with the center of rotation Q, of the tool 12 as shown in FIG. 2, the tool of length l is rotated through an angle b in the B-axial direction (the vertical rotational direction) and through an angle c in the C-axial direction (the horizontal rotational direction). Then, the orthogonal coordinates ($I_O$, $J_O$, $K_O$) of the front end of the tool are expressed by:

$$I_O = l \cdot \sin b \cdot \cos c \quad (6)$$

$$J_O = l \cdot \sin b \cdot \sin c \quad (7)$$

$$K_O = l \cdot \cos b. \quad (8)$$

When equations (6) through (8) are solved for b and c Equations (4) and (5) result.

In FIG. 3, numeral 105 represents a pulse distribution circuit which executes pulse distribution computations in accordance with the values of x, y, z, b and c obtained by the movement data calculation circuit 104 and which delivers distributed pulses XP, YP, ZP, BP and CP for the respective axes. Designated by 106X, 106Y, 106Z, 106B and 106C are respective servo circuits which receive the distributed pulses XP, YP, ZP, BP and CP and rotate corresponding servomotors, 107X, 107Y, 107Z, 107B and 107C.

Now, the operation of the present invention will be described.

The coordinate values (X, Y, Z) of the front end position of the tool and the vector (I, J, K) of the tool axis direction are loaded into the movement data calculation circuit 104, from the command tape 101. The movement data calculation circuit 104 then executes the calculations of Equations (1) to (5) using the loaded values (X, Y, Z) and (I, J, K), and the length l measured from the rotational center of the tool to the front end position thereof and input via a dial or the like 103 prior to the calculations, to find the orthogonal coordinate values (x, y, z) of the position Q of the rotational center of the tool and the spherical coordinate values (b, c) indicative of the position of the rotational angle of the tool. The circuit 104 then applies the calculated values to the pulse distribution circuit 105.

When supplied with x, y, z, b and c, the pulse distribution circuit 105 computes movement values (incremental values) for the respective axial directions, on the basis of which known DDAs (Digital Differential Analyzers) or the like execute pulse distribution computations and deliver distributed pulses XP, YP, ZP, BP and CP for the respective axes. These distributed pulses for the respective axes are applied to the servo circuits 106X–106C which rotate and drive the corresponding servomotors 107X–107C using wellknown servo control so as to move the tool or table as programmed and to subject the workpiece to desired machining.

On the other hand, in a case where only the tool length l has changed and the desired machining shape remains identical, merely a new tool length is set by the dial 103. Thus, the respective circuits operate as in the foregoing, and quite the same machining can be performed on the workpiece even when the tool length has changed.

Further, in a case where rough finishing and fine finishing, for example, need to be performed on one workpiece, it is only required to properly change the tool lengths l for the rough finishing machining and fine finishing.

In the above, the present invention has been described in detail in conjunction with the drawings, but it is not restricted to the embodiment. By way of example, while the case of rotating the tool in the B- and C-axial directions has been described, the invention is also applicable to a case where, letting another rotational direction be an A-axial direction, the tool is rotated in the A- and B-axial directions or the A- and C-axial directions, or a case where the tool is rotated in any desired axial direction.

Figure 4:
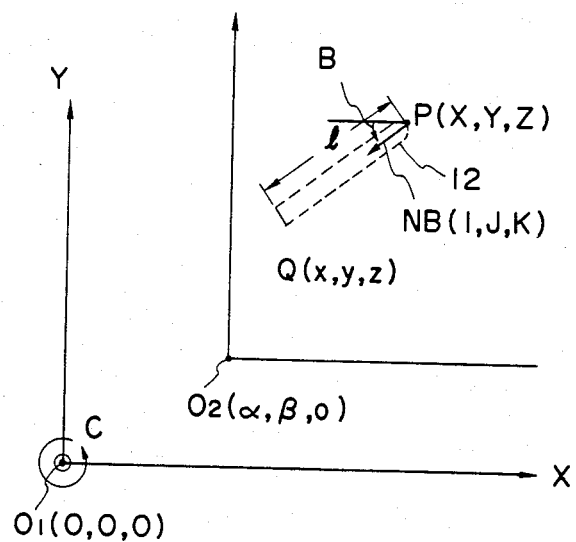
FIG. 4 is a diagram illustrating the case where both a tool and a workpiece are rotated.

Furthermore, while the case of rotating the tool has been described, the invention is also applicable to a case where the workpiece is rotated or to a case where both the tool and the workpiece are rotated in axial directions different from each other. In such cases, however, the equations of transformation differ from those given in Equations (1)–(5). For example, the equations of transformation when rotating the tool in the B-axial direction and when rotating the table in the C-axial direction about the Z-axis are as follows. Referring to FIG. 4, the rotational center $O_1$ of the table is taken as the absolute origin (O, O, O), and the coordinates of the origin $O_2$ of the machine system are taken as ($\alpha$, $\beta$, O). Accordingly, when the absolute origin $O_1$ and the machine origin $O_2$ agree, $\alpha = \beta = O$ holds.

$$x = \left(X + \alpha + \frac{I}{L} l\right) \cdot \cos(-c) - \left(Y + \beta + \frac{J}{L} l\right) \cdot \sin(-c)$$

$$y = \left(X + \alpha + \frac{I}{L} l\right) \cdot \sin(-c) + \left(Y + \beta + \frac{J}{L} l\right) \cdot \cos(-C)$$

$$z = Z + \frac{K}{L} l$$

$$b = \tan^{-1}(\sqrt{I^2 + J^2}/K)$$

$$c = \tan^{-1}(J/I)$$

where

-continued $$L = \sqrt{I^2 + J^2 + K^2}$$

In the embodiment, the case where the command tape (e.g., paper tape or magnetic tape) is employed as the input medium has been described, however, the present invention does not exclude any other input medium.

According to the present invention, even when a tool length l has changed, a command tape need not be remade so as long as the shape to be machined remains the same. In addition, in a machining operation which performs rough finishing and fine finishing, the tool lengths which are to be set need only be changed, and a single command tape can be used for both machining types. In this manner, the present invention does not require the preparation of a plurality of command tapes. Therefore, the invention can reduce expenses for tape preparation and can enhance machining efficiency. It can also provide a numerical control device which is low in overall cost and easy to use.

What is claimed is:

1. A numerical control method for a tool or a table which is rotated in at least one of a vertical and a horizontal direction so as to control the axial direction of the tool relative to a workpiece and where the tool or table is also moved in the directions of X-, Y- and Z-axes to subject the workpiece to desired three-dimensional machining, said numerical control method comprising the steps of:

entering command data which includes a position (X, Y, Z) of a front end of said tool and a vector (I, J, K) of the tool axis direction of said tool via first input means;

entering a tool length (l), measured from a center of rotation of said tool to the front end of said tool, via second input means separate from the first input means;

calculating orthogonal coordinate values (x, y, z) of the center of rotation of said tool and a position (b, c) of a rotational angle of said tool or said workpiece from the command data and the length (l) via a numerical control device; and executing interpolation computations in accordance with the calculated resultant positional information of the tool so as to move said tool to a commanded position.

2. A numerical control system as defined in claim 1, wherein the orthogonal coordinate values (x, y, z) of the center of rotation of said tool and the values of the position (b, c) of the rotational angle of said tool or said workpiece, are calculated in accordance with the following $$x = X + \frac{I}{\sqrt{I^2 + J^2 + K^2}} \cdot l, \quad y = Y + \frac{J}{\sqrt{I^2 + J^2 + K^2}} \cdot l$$

$$z = \frac{K}{\sqrt{I^2 + J^2 + K^2}} \cdot l, \quad b = \tan^{-1}\frac{\sqrt{I^2 + J^2}}{K} \text{ and}$$

$$c = \tan^{-1}\frac{J}{I}$$

3. A numerical control system having a tool positioned with respect to an orthogonal coordinate system having a first origin and x, y, z axes and a spherical coordinate system having b, c axes and a second origin coinciding with said first origin, the tool being capable of movement with respect to 5 axes and having a tip portion with coordinates (X, Y, Z), an axial position vector (I, J, K) and a center of rotation, said system including:

receiving means for receiving command data including the position X, Y, Z of the tip portion and the position vector I, J, K and for receiving data indicating a length (l), of the tool, the length being measured from the center of rotation of the tool to the tip of the tool;

numerical control means for calculating the orthogonal coordinates (x, y, z) of the center of rotation and for calculating the spherical coordinate angle of the tool (b, c), in accordance with said command data and said length (l) of the tool; and pulse distributing means for providing distributed pulses for each of the five axes in accordance with the orthogonal coordinates and spherical coordinates calculated by said numerical control means.

4. A numerical control system according to claim 3, wherein said numerical control means includes means for calculating $$x = X + \frac{I}{\sqrt{I^2 + J^2 + K^2}} \cdot l$$

$$y = Y + \frac{J}{\sqrt{I^2 + J^2 + K^2}} \cdot l$$

$$z = Z + \frac{K}{\sqrt{I^2 + J^2 + K^2}} \cdot l$$

$$b = \tan^{-1}\frac{\sqrt{I^2 + J^2}}{K}$$

$$c = \tan^{-1}\frac{J}{I}.$$

5. A numerical control system having a tool positioned with respect to a first orthogonal coordinate system having a origin $O_1$ (O, O, O,), a second orthogonal coordinate system positioned with respect to the first coordinate system and having an origin $O_2$ ($\alpha,\beta,0$) rotated through an angle C with respect to the first coordinate system, and a spherical coordinate system having b and c axes and an origin coinciding with the origin $O_1$, the tool being capable of movement with respect to five axes and having a tip portion with coordinates X, Y, Z, an axial position vector I, J, K, and a center of rotation, said system including:

receiving means for receiving data including the position X, Y, Z, and the vector I, J, K and for receiving data indicating a length l, of the tool, the length being measured from the center of rotation of the tool to the tip portion of the tool;

numerical control means for calculating the orthogonal coordinates (x, y, z) of the center of rotation and for calculating the spherical coordinates of the tool (b, c), in accordance with said command data and said length l of the tool using the following $$x = \left(X + \alpha + \frac{I}{L}l\right) \cdot \cos(-c) - \left(Y + \beta + \frac{J}{L}l\right) \cdot \sin(-c)$$

-continued $$y = \left\{ X + \alpha + \frac{I}{L} l \right\} \cdot \sin(-c) + \left\{ Y + \beta + \frac{J}{L} l \right\} \cdot \cos(-c)$$

$$z = Z + \frac{K}{L} l$$

$$b = \tan^{-1}(I^2 + J^2/K)$$

$$c = \tan^{-1}(J/I)$$

where
$L = I^2 + J^2 + K^2$; and
pulse distributing means for providing distributed pulses for each of the five axes in accordance with the orthogonal coordinates and spherical coordinates calculated by said numerical control means.

* * * * *

UNITED STATES PATENT AND TRADEMARK OFFICE
CERTIFICATE OF CORRECTION

PATENT NO. : 4,516,211

DATED : May 7, 1985

INVENTOR(S) : RYOICHIRO NOZAWA ET AL.

It is certified that error appears in the above-identified patent and that said Letters Patent is hereby corrected as shown below:

Col. 2, line 59, "in" should be --. In--.

Signed and Sealed this

Eighth Day of October 1985

[SEAL]

Attest:

Attesting Officer

DONALD J. QUIGG

Commissioner of Patents and
Trademarks—Designate